(12) United States Patent
Gerver et al.

(10) Patent No.: US 11,558,473 B2
(45) Date of Patent: Jan. 17, 2023

(54) ASPECT AWARE STREAMS COMPUTING

(71) Applicant: International Business Machines Corporation, Armonk, NY (US)

(72) Inventors: Paul Gerver, Rochester, MN (US); Jingdong Sun, Rochester, MN (US); Bradley William Fawcett, Byron, MN (US); Jason A. Nikolai, Rochester, MN (US); Henry Chiu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 17/124,854

(22) Filed: Dec. 17, 2020

(65) Prior Publication Data

US 2022/0201099 A1 Jun. 23, 2022

(51) Int. Cl.
*H04L 67/00* (2022.01)
*H04L 67/025* (2022.01)
(Continued)

(52) U.S. Cl.
CPC ............ *H04L 67/34* (2013.01); *G06F 11/302* (2013.01); *G06F 11/3006* (2013.01); *H04L 43/0817* (2013.01); *H04L 67/025* (2013.01)

(58) Field of Classification Search
CPC ..... H04L 65/607; H04L 67/02; H04L 1/0003; H04L 1/0009; H04L 1/0025; H04L 69/323; H04L 65/60; H04L 12/2801; H04L 2007/045; H04L 65/605; H04L 2209/38; H04L 2209/601; H04L 29/06; H04L 29/06027; H04L 47/25; H04L 65/4092; H04L 69/16; H04L 9/32; H04L 9/3236; H04L 9/3247; H04L 43/16; H04L 49/90;
(Continued)

(56) References Cited

U.S. PATENT DOCUMENTS 8,458,650 B2 6/2013 Andrade et al.
8,949,801 B2 2/2015 Andrade et al.
(Continued)

OTHER PUBLICATIONS

"Dynamic Proxy Classes", Oracle, 1993, 2020, 8 pages, downloaded on Oct. 12, 2020 from: https://docs.oracle.com/javase/8/docs/technotes/guides/reflection/proxy.html.
(Continued)

*Primary Examiner* — Djenane M Bayard
(74) *Attorney, Agent, or Firm* — Kelsey M. Skodje

(57) ABSTRACT

A stream of tuples to be processed by processing elements that operate on one or more compute nodes of a stream application is monitored. Each processing element has one or more stream operators. A program request to execute a set of program code instructions is received. A stream application target of the set of program code instructions is identified based on the program request. A portion of the stream application is encapsulated with a generic program execution structure during operation of the stream application. The structure is configured to receive and execute program code instructions outside of a preconfigured operation of the stream application. The set of program code instructions is executed by the structure during operation of the stream application, at a time period of execution of the portion, in response to the program request, and based on the stream application target.

20 Claims, 4 Drawing Sheets

(51) Int. Cl.
*G06F 11/30* (2006.01)
*H04L 43/0817* (2022.01)

(58) Field of Classification Search
CPC ....... H04L 65/601; H04L 69/22; H04L 12/18;
H04L 12/4608; H04L 12/4633; H04L
12/56; H04L 12/5601; H04L 12/6418;
H04L 2012/6483; H04L 29/12009; H04L
29/12481; H04L 41/0213; H04L 43/00;
H04L 45/00; H04L 67/34; H04L 43/0817;
H04L 67/025; G06F 11/3006; G06F
11/302; G06F 9/44521; G06F 16/24568;
G06F 9/4494; G06F 8/41; G06F 9/44505;
G06F 8/316
See application file for complete search history.

(56) References Cited

U.S. PATENT DOCUMENTS

| | | | |
|---|---|---|---|
| 8,997,039 B2 | 3/2015 | Andrade et al. | |
| 9,525,715 B2 | 12/2016 | Bragstad et al. | |
| 10,025,826 B2 | 7/2018 | Barsness et al. | |
| 10,241,762 B2 | 3/2019 | Chanson et al. | |
| 10,691,489 B2 | 6/2020 | Barsness et al. | |
| 2007/0288459 A1* | 12/2007 | Kashiyama | G06F 16/20 |
| 2009/0043906 A1* | 2/2009 | Hurst | H04N 21/4331 |
| | | | 725/40 |
| 2011/0246616 A1* | 10/2011 | Ronca | H04L 67/02 |
| | | | 709/219 |
| 2018/0121448 A1 | 5/2018 | Barsness et al. | |
| 2018/0203892 A1 | 7/2018 | Cook et al. | |
| 2020/0142898 A1 | 5/2020 | Barsness et al. | |

OTHER PUBLICATIONS

Wilson, J., Aspect-Oriented Programming in Spring Boot Part 2: Spring JDK Proxies vs CGLIB vs AspectJ., 9 pages, May 9, 2016, Credera, downloaded from the following website: https://www.credera.com/blog/technology-insights/open-source-technology-insights/aspect-oriented-programming-in-spring-boot-part-2-spring-jdk-proxies-vs-cglib-vs-aspectj/.

* cited by examiner

ASPECT AWARE STREAMS COMPUTING

BACKGROUND

The present disclosure relates to stream computing, and more specifically, to affecting the operation of a stream application based on aspect program code.

Stream computing may be utilized to provide real-time analytic processing to large quantities of data. Stream computing may be based on a precompiled fixed set of processing elements or stream operators.

SUMMARY

According to embodiments, disclosed are a method, system, and computer program product.

A stream of tuples may be monitored. The stream of tuples are processed by a plurality of processing elements that operate on one or more compute nodes of a stream application, each processing element having one or more stream operators. A program request, to execute a first set of one or more program code instructions, is received. A stream application target of the first set of program code instructions is identified based on the program request. A first portion of a set of one or more portions of the stream application is encapsulated with a generic program execution structure. The encapsulating is during operation of the stream application. The generic program execution structure is configured to receive and execute program code instructions outside of a preconfigured operation of the stream application. The first set of program code instructions is executed by the generic program execution structure at a first time period of execution of the first portion of the stream application. The executing of the first set of program code instructions is in response to the program request, based on the stream application target, and during operation of the stream application.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
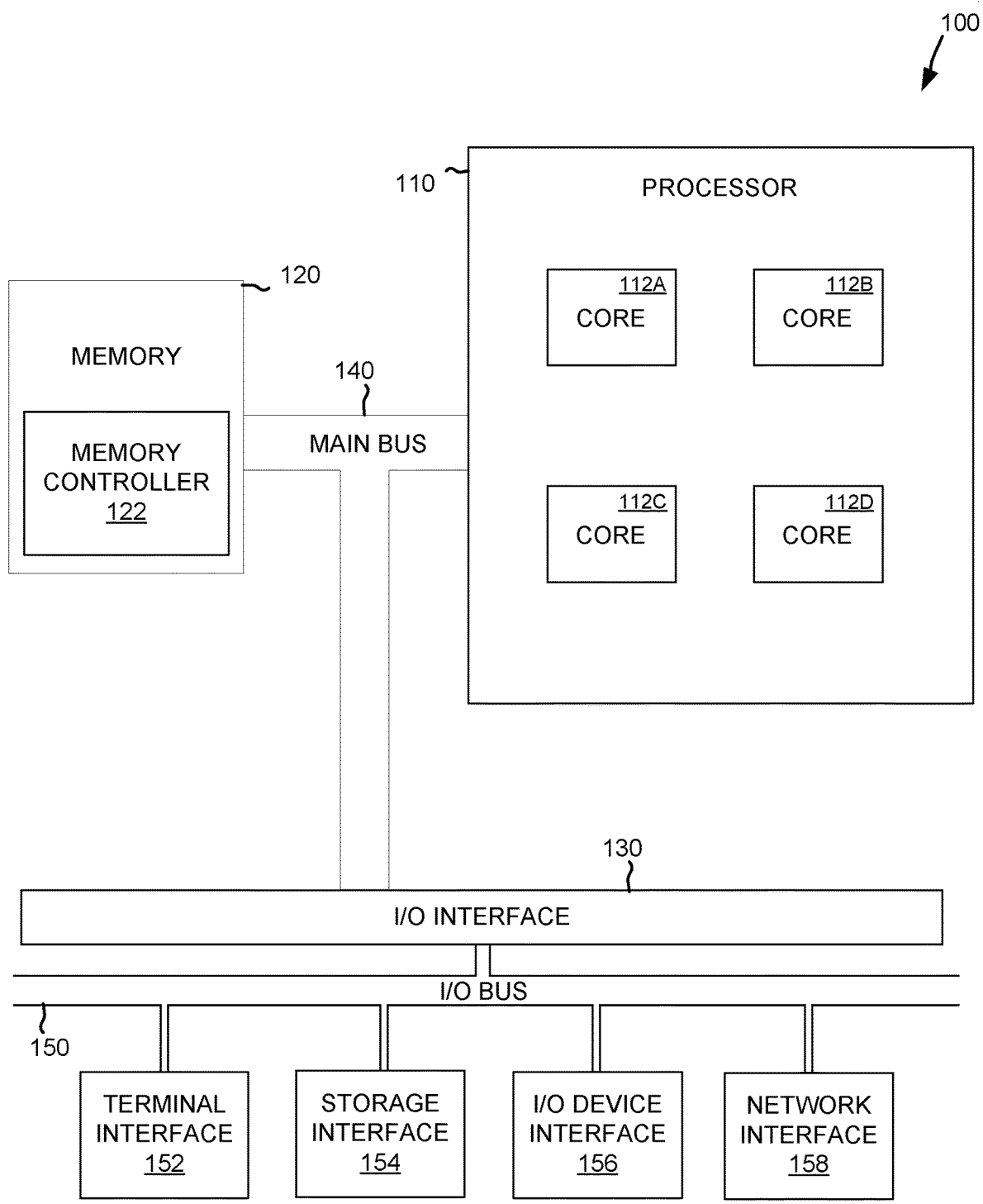
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing, and more particular aspects relate to affecting the operation of a stream application based on aspect program code. While the present disclosure is not necessarily limited to such applications, various aspects of the disclosure may be appreciated through a discussion of various examples using this context.

One of the uses of computing systems (alternatively, computer systems) is to collect available information, manipulate the collected information, and make decisions based on the manipulated information. Computer systems may operate on information through means of databases that allow users to determine what has happened and to make predictions for future results based on past events. These computer systems may receive information from a variety of sources and then record the information into permanent databases. After the information has been recorded in the databases, the computing systems may run algorithms on the information sometimes generating new information and then performing associated transformations on and storing of the new information—to make determinations and provide context to users.

The ability of computer systems to analyze information and provide meaning to users may be insufficient in some situations. The ability of large organizations, such as corporations and governments, to make decisions based on information analysis may be impaired by the limited scope of the information available. In addition, the analysis may be of limited value because it relies on stored structural databases that may contain out-of-date information. This may lead to decisions that are of limited value or, in some cases, inaccurate. For example, a weather forecast service may be unable to accurately predict precipitation for a given region, or a stock brokerage firm may make an incorrect decision regarding a trend in trading of shares.

The analytical shortcomings of computer systems may be compounded by other factors. First, the world may be becoming more instrumented, as previously unintelligent devices are now becoming intelligent devices. Intelligent devices may include devices that have historically been unable to provide analytical information, but with the additions of sensors, can now do so (e.g., automobiles that are now able to provide diagnostic information to their owners or manufacturers, thermostats that now communicate information about daily temperature fluctuations in homes to users via webpages). Second, these shortcomings may also be compounded by an increase in communication from information sources, as previously isolated devices are now becoming interconnected (e.g., appliances within homes communicate with each other and with power utilities to more efficiently utilize electricity). These new sources of information may provide volumes of not only isolated data points but also relationships between the newly intelligent devices.

A third compounding factor is that users of computing systems may prefer continuous analysis of streams of information, while methods of data acquisition may provide only an event-based approach of analyzing pre-recorded information. For example, an analytics package may receive a finite amount of data and, later, apply analysis to the data. This approach may not work when dealing with a continuous stream of data. A fourth compounding factor is that computer systems may have deficiencies in handling not only the volume of information but also in dealing with the unstructured nature of the information; for example, sensors, cameras, and other new data sources may provide no context or format, just raw information. The analytics methods of computing systems may need to modify and rearrange this data in order to provide any kind of context for the raw information. The modifications and rearrangements may take time or resources that many computing systems may not be able to provide.

Yet another potential drawback is that computing systems may not provide scalable solutions to new users. The advent of smart and connected devices has provided new use-cases for analytics of continuous streams of information. Modern systems of large-scale data collection, however, may require significant user training and provide unintuitive interfaces. For example, a farmer may have each animal on a farm instrumented with sensors to monitor the health and location of the animals. The data from these sensors may enable the farmer to respond to ever-changing health conditions of the animals, but only if the sensor data is collected and transformed into a usable format to provide meaningful information to the farmer in real-time. The farmer may not have the resources to provide to a technical expert to construct a large-scale analytics package, and the obtained information may be left unused.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

I. Stream Computing

Stream computing may allow users to process big-data and provide advanced metrics upon that big-data continuously as it is being generated by a variety of sources. A stream application may provide stream computing by generating a configuration of one or more processing elements, each processing element containing one or more stream operators. For example, a stream application may be compiled with a fixed logic contained in each processing element and/or stream operator. Each processing element and/or stream operator of the stream application may process big-data by generating and modifying information in the form of tuples. Each tuple may have one or more attributes (e.g., the tuples may be analogous to rows and the attributes analogous to columns in a table).

The stream application may deploy an instance of the configuration to a set of hardware compute nodes. The stream application may then administer the instance by adjusting the hardware to perform the stream application as it is configured, such as by load balancing the processing elements onto compute nodes, onto a portion of a given compute node, or across multiple compute nodes.

Figure 2:
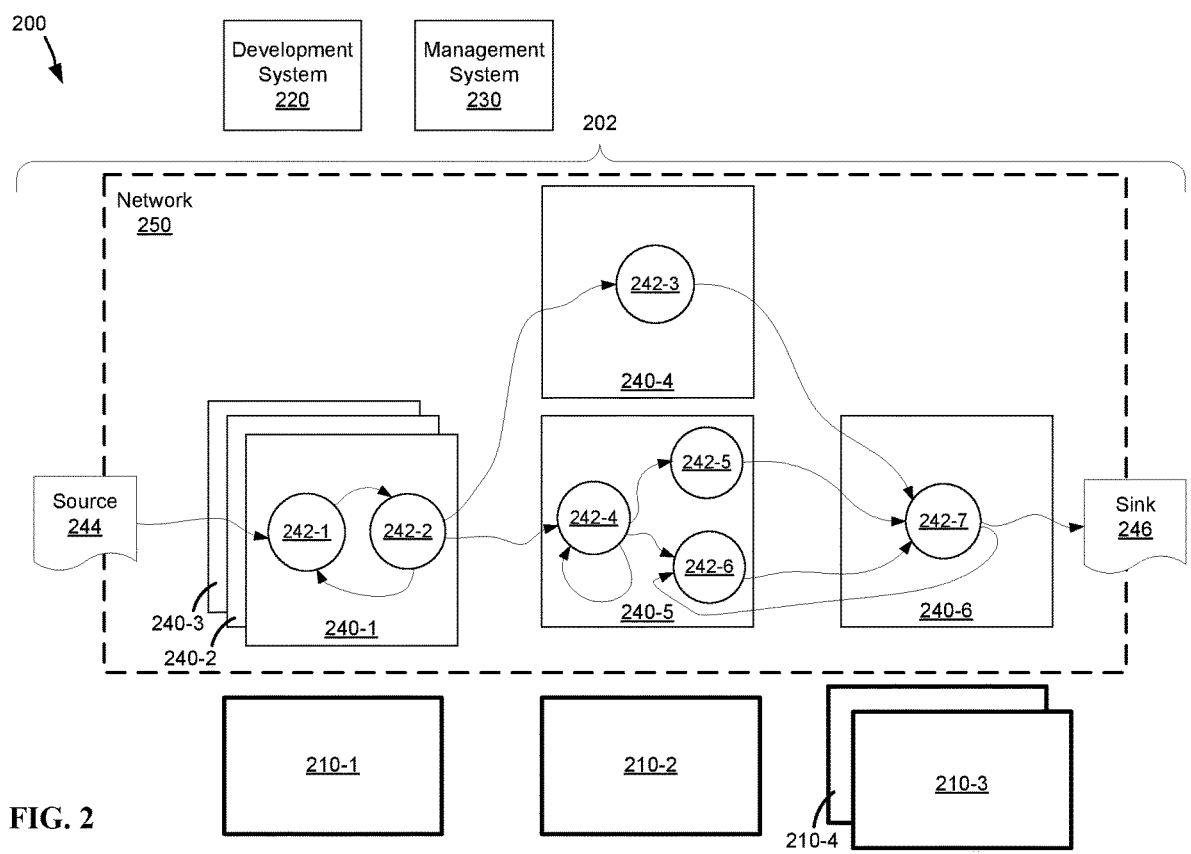
FIG. 2 depicts an example stream computing application configured to operate on a stream of tuples consistent with some embodiments of the present disclosure.

FIG. 2 depicts an example stream computing application (stream application) 200 configured to operate on a stream of tuples consistent with some embodiments of the present disclosure. The stream application 200 may be represented in the form of an operator graph 202. The operator graph 202 may visually represent to a user the flow of data through the stream application 200. The operator graph 202 may define how tuples are routed through the various components of the stream application 200 (e.g., an execution path, a precompiled logical layout of processing and resource allocation represented in FIG. 2 by the curved arrowed lines). The stream application 200 may include one or more compute nodes 210-1, 210-2, 210-3, and 210-4 (collectively, 210); a development system 220; a management system 230; one or more processing elements 240-1, 240-2, 240-3, 240-4, 240-5, and 240-6 (collectively, 240); one or more stream operators 242-1, 242-2, 242-3, 242-4, 242-5, 242-6, 242-7 (collectively, 242); and a network 250.

The stream application 200 may receive information from one or more sources 244. The stream application 200 may output information to one or more sinks 246. The input may be from outside the stream application 200, such as from a plurality of Internet of Things (IoT) devices. The stream network 250 may be a communicate layer that handles connections, sends, and receives data between portions of the stream application 200. For example, stream network 250 may be a transport layer of data packets internal to the stream application 200 and configured to communicatively couple the processing elements 240.

Configuration of the stream application 200, depicted by operator graph 202, is merely an example stream application. Stream applications may vary in the number of compute nodes, processing elements, or stream operators. The stream application may also vary the roles and/or responsibilities performed by any of the components or may include other components not depicted. For example, some or all of the functionality of the development system 220 may be performed by the management system 230. In another example, the functionalities of the development system 220 and the management system 230 may be performed by a singular administrative system (not depicted). The administrative system may be configured to perform these tasks without deviation from the embodiments disclosed herein. In yet another example, the functionalities of the development system 220 and the management system 230 may be performed by a plurality of services (e.g., ten or more individual software programs each configured to perform a specific function).

The compute nodes 210 may be computer systems and may each include the following components: a processor, a memory, and an input/output interface (herein I/O). Each compute node 210 may also include an operating system or a hypervisor. In some embodiments, the compute nodes 210 may perform operations for the development system 220, the management system 230, the processing elements 240, and/or the stream operators 242. The compute nodes 210 may be categorized as management hosts, application hosts, or mixed-use hosts. A management host may perform operations for the development system 220 and/or the management system 230. An application host may perform operations for the processing elements 240 and stream operators 242. A mixed-use host may perform operations of both a management host and an application host. FIG. 1 depicts a computer system 100 that may be a compute node consistent with some embodiments.

A network (not depicted) may commutatively couple each of the nodes 210 together (e.g., a local area network, the Internet, etc.). For example, node 210-1 may communicate with nodes 210-2, 210-3, and 210-4 through the network. The compute nodes 210 may communicate with the network by way of the I/O. The network may include a variety of physical communication channels or links. The links may be wired, wireless, optical, or any other suitable media. The network may include a variety of network hardware and software for performing routing, switching, and other functions, such as routers, switches, or bridges. The nodes 210 may communicate through a variety of protocols (e.g., the internet protocol, the transmission control protocol, the file transfer protocol, the hypertext transfer protocol, etc.). In some embodiments, the nodes 210 may share the network with other hardware, software, or services (not depicted).

The development system 220 may provide a user with the ability to create a stream application that is targeted to process specific sets of data. The development system 220 may operate on an instance of a computer system (not depicted), such as the computer system 100. The development system 220 may operate on one or more of the compute nodes 210. The development system 220 may generate one or more configuration files that describes the stream computing application 200 (e.g., the processing elements 240, the stream operators 242, the sources 244, the sinks 246, the assignment of the aforementioned compute nodes 210, etc.). The development system 220 may receive requests from a user to generate the stream application 200. The development system 220 may receive requests from a user to generate other stream applications (not depicted). The development system 220 may communicate with the management system 230 to pass along the configuration on any stream applications that the development system 220 may create.

The development system 220 may generate the configuration by considering the performance characteristics of the software components (e.g., the processing elements 240, the stream operators 242, etc.) the hardware (e.g., the compute nodes 210, the network) and the data (e.g., the sources 244, the format of the tuples, etc.). In a first example, the development system 220 may determine that the overhead of running processing elements 240-1, 240-2, and 240-3 together on compute node 210-1 results in better performance than running them on separate compute nodes. The performance may be better because of a latency incurred by running processing elements 240-1, 240-2, and 240-3 across the network 250 between compute nodes 210-1 and 210-2. In a second example, the development system 220 may determine that the memory footprint of placing stream operators 242-3, 242-4, 242-5, and 242-6 into a single processing element 240-5 is larger than the cache of a first processor in compute node 210-2. To preserve memory space inside the cache of the first processor, the development system 220 may decide to place only the stream operators 242-4, 242-5, and 242-6 into a single processing element 240-5, despite the inter-process communication latency of having two processing elements 240-4 and 240-5.

In a third example of considering the performance characteristics, the development system 220 may identify a first operation (e.g., an operation being performed on processing element 240-6 on compute node 210-3) that requires a larger amount of resources of the stream application 200. The development system 220 may assign a larger amount of resources (e.g., operating the processing element 240-6 on compute node 210-4 in addition to compute node 210-3) to aid the performance of the first operation. The development system 220 may identify a second operation (e.g., an operation being performed on processing element 240-1) that requires a smaller amount of resources within the stream application 200. The development system 220 may further determine that the stream application 200 may operate more efficiently through an increase in parallelization (e.g., more instances of processing element 240-1). The development system 220 may create multiple instances of processing element 240-1 (e.g., processing elements 240-2 and 240-3). The development system 220 may then assign processing elements 240-1, 240-2, and 240-3 to a single resource (e.g., compute node 210-1). Lastly, the development system 220 may identify a third operation and fourth operation (e.g., operations being performed on processing elements 240-4 and 240-5) that each require low levels of resources. The development system 220 may assign a smaller amount of resources to the two different operations (e.g., having them share the resources of compute node 210-2 rather than each operation being performed on its own compute node).

The development system 220 may include a compiler (not depicted) that compiles modules (e.g., processing elements 240, stream operators 242, etc.). The modules may be source code or other programmatic statements. The modules may be in the form of requests from a stream processing language (e.g., a computing language containing declarative statements allowing a user to state a specific subset from information formatted in a specific manner). The compiler may translate the modules into an object code (e.g., a machine code targeted to the specific instruction set architecture of the compute nodes 210). The compiler may translate the modules into an intermediary form (e.g., a virtual machine code). The compiler may be a just-in-time compiler that executes as part of an interpreter. In some embodiments, the compiler may be an optimizing compiler. In some embodiments, the compiler may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The management system 230 may monitor and administer the stream application 200. The management system 230 may operate on an instance of a computer system (not depicted), such as computer system 100. The management system 230 may operate on one or more of the compute nodes 210. The management system 230 may also provide the operator graph 202 of the stream application 200. The management system 230 may host the services that make up the stream application 200 (e.g., services that monitor the health of the compute nodes 210, the performance of the processing elements 240 and stream operators 242, etc.). The management system 230 may receive requests from users (e.g., requests to authenticate and authorize users of the stream application 210, requests to view the information generated by the stream application, requests to view the operator graph 202, etc.).

The management system 230 may provide a user with the ability to create multiple instances of the stream application 200 configured by the development system 220. For example, if a second instance of the stream application 200 is required to perform the same processing, then the management system 230 may allocate a second set of compute nodes (not depicted) for performance of the second instance of the stream application. The management system 230 may also reassign the compute nodes 210 to relieve bottlenecks in the system. For example, as shown, processing elements 240-4 and 240-5 are executed by compute node 210-2. Processing element 240-6 is executed by compute nodes 210-3 and 210-4. In one situation, the stream application 200 may experience performance issues because processing elements 240-4 and 240-5 are not providing tuples to processing element 240-6 before processing element 240-6 enters an idle state. The management system 230 may detect these performance issues and may reassign resources from compute node 210-4 to execute a portion or all of processing element 240-4, thereby reducing the workload on compute node 210-2. The management system 230 may also perform operations of the operating systems of the compute nodes 210, such as the load balancing and resource allocation of the processing elements 240 and stream operators 242. By performing operations of the operating systems, the management system 230 may enable the stream application 200 to more efficiently use the available hardware resources and increase performance (e.g., by lowering the overhead of the operating systems and multiprocessing hardware of the compute nodes 210).

The processing elements 240 may perform the operations of the stream application 200. Each of the processing elements 240 may operate on one or more of the compute nodes 210. In some embodiments, a given processing element 240 may operate on a subset of a given compute node 210, such as a processor or a single core of processor of a compute node 210. In some embodiments, a given processing element 240 may correspond to an operating system process of an operating system hosted by a compute node 210. In some embodiments, a given processing element 240 may operate on multiple compute nodes 210. The processing elements 240 may be generated by the development system 220. Each of the processing elements 240 may be in the form of a binary file and additionally library files (e.g., an executable file and associated libraries, a package file containing executable code and associate resources, etc.).

Each of processing elements 240 may include configuration information from the development system 220 or the management system 230 (e.g., the resources and conventions required by the relevant compute node 210 to which it has been assigned, the identity and credentials necessary to communicate with the sources 244 or sinks 246, and the identity and credentials necessary to communicate with other processing elements, etc.). Each of the processing elements 240 may be configured by the development system 220 to run optimally upon one of the compute nodes 210. For example, processing elements 240-1, 240-2, and 240-3 may be compiled to run with optimizations recognized by an operating system running on compute node 210-1. The processing elements 240-1, 240-2, and 240-3 may also be optimized for the particular hardware of compute node 210-1 (e.g., instruction set architecture, configured resources such as memory and processor, etc.).

Each of processing elements 240 may include one or more stream operators 242 that perform basic functions of the stream application 200. As streams of tuples flow through the processing elements 240, as directed by the operator graph 202, they pass from one stream operator to another (e.g., a first processing element may process tuples and place the processed tuples in a queue assigned to a second processing element, a first stream operator may process tuples and write the processed tuples to an area of memory designated to a second stream operator, tuples after processing may not be moved but may be updated with metadata to signify they are ready for processing by a new processing element or stream operator, etc.). Multiple stream operators 242 within the same processing element 240 may benefit from architectural efficiencies (e.g., reduced cache missed, shared variables and logic, reduced memory swapping, etc.). The processing elements 240 and the stream operators 242 may utilize inter-process communication (e.g., network sockets, shared memory, message queues, message passing, semaphores, etc.). The processing elements 240 and the stream operators 242 may utilize different inter-process communication techniques depending on the configuration of the stream application 200. For example: stream operator 242-1 may use a semaphore to communicate with stream operator 242-2; processing element 240-1 may use a message que to communicate with processing element 240-3; and processing element 240-2 may use a network socket to communicate with processing element 240-4.

The stream operators 242 may perform the basic logic and operations of the stream application 200 (e.g., processing tuples and passing processed tuples to other components of the stream application). By separating the logic that may occur within a single larger program into basic operations performed by the stream operators 242, the stream application 200 may provide greater scalability. For example, tens of compute nodes hosting hundreds of stream operators in a given stream application may enable processing of millions of tuples per second. The logic may be created by the development system 220 before runtime of the stream application 200. In some embodiments, the sources 244 and the sinks 246 may also be stream operators 242. In some embodiments, the sources 244 and the sinks 246 may link multiple stream applications together (e.g., the sources 244 could be sinks for a second stream application, and the sinks 246 could be sources for a third stream application). The stream operators 242 may be configured by the development system 220 to optimally perform the stream application 200 using the available compute nodes 210. The stream operators 242 may send and receive tuples from other stream operators. The stream operators 242 may receive tuples from the sources 244 and may send tuples to the sink 246.

The stream operators 242 may perform operations (e.g., conditional logic, iterative looping structures, type conversions, string formatting, filter statements, etc.) upon the attributes of a tuple. In some embodiments, each stream operator 242 may perform only a very simple operation and may pass the updated tuple on to another stream operator in the stream application 200—simple stream operators may be more scalable and easier to parallelize. For example, stream operator 242-2 may receive a date value to a specific precision and may round the date value to a lower precision and pass the altered date value to stream operator 242-4 that may change the altered date value from a 24-hour format to a 12-hour format. A given stream operator 242 may not change anything about a tuple. The stream operators 242 may perform operations upon a tuple by adding new attributes or removing existing attributes.

The stream operators 242 may perform operations upon a stream of tuples by routing some tuples to a first stream operator and other tuples to a second stream operator (e.g., stream operator 242-2 sends some tuples to stream operator 242-3 and other tuples to stream operator 242-4). The stream operators 242 may perform operations upon a stream of tuples by filtering some tuples (e.g., culling some tuples and passing on a subset of the stream to another stream operator). The stream operators 242 may also perform operations upon a stream of tuples by routing some of the stream to itself (e.g., stream operator 242-4 may perform a simple arithmetic operation and, as part of its operation, it may perform a logical loop and direct a subset of tuples to itself). In some embodiments, a particular tuple output by a stream operator 242 or processing element 240 may not be considered to be the same tuple as a corresponding input tuple even if the input tuple is not changed by the stream operator or the processing element.

In some situations, a stream application may be largely a static big-data operating mechanism. Such a stream application, once configured, may not be changeable in the context it provides to a user. For example, after development of the operator graph 202, development system 220 may provide the generated form of the operator graph with the configuration of the stream application 200 to the management system 230 for execution by the compute nodes 210. Further, in some situation, such a stream application performs certain logic in how it processes tuples. This logic, once configured, may not be updatable or changeable until a new stream application is compiled. Trying to provide an update to a processing element or stream operator of such a configured stream instance may be impractical because of the real-time continuous nature of stream applications and the information stream applications process. For example, any down-time, even in microseconds, may cause the stream application to not collect one or more tuples during the changeover from an originally configured processing element to an updated processing element. Missing a portion of the data may result in a partial or complete failure of the stream application and the stream application may be unable to provide users with context to big-data sources.

Another problem can occur when too much or too little data is flowing through a stream application. For example, the logic in a given stream operator may provide for a stream application that processes only a subset, selection, or portion of tuples. If too few tuples are processed based on the configuration of a stream operator, poor analytical value may result because the dataset is too small to derive meaning. To compensate, a precompiled stream application may be configured to ingest and process many tuples. If too many tuples are processed based on the configuration of a stream operator, there may be bottlenecks in the system (e.g., processor or memory starvation). In other instances, one or more tuples may be dropped because a portion of the stream application is overwhelmed (e.g., one or more compute nodes may not process certain tuples when a large number of tuples are received). For example, when too much data (too many tuples) floods the stream application, random tuples may be dropped, or the system becomes backed up and crashes.

The unoptimized configurations of stream applications may be based on no fault or ill intent but, rather, due to practical considerations. In detail, a given stream application may be generated based on the type or amount of test data that is created during a development phase of the stream application. As analytics of big-data is a relatively new phase of computing, it may be difficult to forecast or predict the type, amount, and best route of processing of tuples in a streams application. For example, stream application 200 may be developed by development system 220 based on test data or based on a source 244 that was under a differing set of conditions. As a result, development system 220 may assign computing resources, and data flow (as represented by the curved lines of FIG. 2) based on incomplete or stale understanding of data processing. As analytics of a situation may develop, the configuration of the operator graph 202 may not deal with the practical issues of production data, or updating real-world events or information that are changing, and thus affecting the type and/or amount of data coming from source 244.

Given some of these drawbacks, there may be a practical need to develop a real-time analytics application to solve many different factors. A first factor may be that there is a need for a static analysis of good/bad data formats, values, etc., prior to developing the application. This need for static analysis may be required to properly develop and configure a data analytics system. A second factor may be to plan for many failure scenarios, source changes, or false assumptions about data. For example, data processing may be made on assumptions about the data that is provided by a source, and a way to best process the data. The assumptions may help to design and configure before compilation, instantiation, and running the various stream operators, processing elements, and flow between them; the same assumptions may lead to later issues during actual operation and runtime of a stream application (e.g., incorrect data tuple format, data tuple value check, or other misalignment of configuration and data). A third factor may be that one or more portions of a data analytics or processing system may need to be restarted for various reasons to enable certain functionality to occur or for a change in configuration of the logic or ancillary non-core logic of a given system. Example scenarios that may lead to a stream application to restart may include, altering a logging level, performing increased transactional processing, or alleviating resource bottlenecks by adjusting the conditions for processing of tuples (e.g., passing along, adding, or deleting of tuples).

One attempt to alleviate the drawbacks may be to utilize a microservice architecture. A microservice architecture may attempt to utilize small applications that subscribe to data streams, perform some functionality, then publish them. A microservice architecture may be an incomplete or partial solution. For example, streaming applications analytic applications need to know of and be aware of each and every potential subscription plan before deployment and runtime. A stream application may not be able to be configured for every situation and, as a downside, may have to restart to reconfigure or arrange the output of certain portions of a stream (e.g., an output of a processing element or stream operator) to correct these deficiencies).

Another potential attempt to alleviate the drawbacks may be a job overlay architecture. A job overlay architecture may focus on determining a potential need for performing certain programmatic logic on a running data analysis application, but again, this particular architecture may have drawbacks for stream applications. For example, a job overlay architecture may focus on changing a portion of the core logic ("job logic") of a portion of the stream application, saving the new logic to an application bundle, and applying those changes to a running portion. This solution does not solve the availability issue, however, because it requires a restart of running processes to update the job logic. For example, a portion of the stream application may not be altered once it is running.

II. Aspect Aware Stream Computing

Aspect aware stream computing ("AASC") may overcome the issues related to other types of data analytics in the context of stream applications. AASC may enable a stream application to operate based on one or more aspect-oriented programming techniques. The AASC may include exposing a request processing logic ("hook") for reception of aspects. The hook may be in the form of a generic program execution structure. The generic program execution structure may be configured to receive, or consume, arbitrary code, rules, or other logic, provided by a requestor. The AASC, through the execution by the generic program execution structure, may affect operation of a stream application. Specifically, a request may be sent that includes a set of one or more program code instructions. The set of program code instructions may operate on the stream of tuples and outside of the logic built into the stream operators and/or processing elements of the stream application.

The AASC may be configured to affect the core functionality or the tertiary functionality of a stream application. In detail, the stream application may have a first configuration that was developed before runtime and is enacted and operates during runtime of and operation of the stream application. The generic program execution structure may execute during the operation of the stream application, or outside of operation of the stream application. In a first example, a generic program execution structure may execute a set of program code instructions just before and/or just after a portion of the stream application. The rules may alter the functionality of the streaming application by rerouting, updating, deleting, adding, or otherwise modifying one or more tuples of the stream application.

In some embodiments, the AASC may operate by encapsulating a portion (e.g., a stream operator, a processing element) of the stream application. Encapsulating the portion of the stream application may include performing execution of the generic program execution structure (that is configured to execute a set of received program code instructions) just outside of the logic that makes up the portion. For example, encapsulating may be configured as the first programmatic step after or the last programmatic step before any code that is a part of a given stream operator. Encapsulating the portion of the stream application may include performing execution of the generic program execution structure as an initial or terminal step of a portion of the stream application. For example, encapsulating may be configured as the first programmatic step and/or the last programmatic step of a given stream operator.

The AASC may operate without affecting the availability and execution of the stream application. In detail, the AASC does not cause downtime for a running application, and the core logic of each stream operator and processing element that are executing based on the precompiled logic are unaffected or unaltered. For example, a first stream operator may be configured to operate on tuples based on a filter statement, or other logic to only affect certain tuples of the stream of tuples, and to ignore or pass on other tuples of the stream of tuples. The generic program execution structure may execute sets of program code instructions just before, after, outside of, or separate from the originally compiled logic of the stream application. Consequently, only the affect of the stream application (e.g., the reception, alteration, creation, deletion, and output of tuples) is altered, without altering the core logic.

The AASC may provide advantages over other methods of streams computing. In detail, the AASC may facilitate the quick or temporary injection and/or removal of aspects that can perform various functionality and without a requirement to bounce, restart, or otherwise temporary take offline a streams application. AASC may lend itself for continuous delivery of aspects into an actively running and precompiled stream application. This extensibility of streams application through the AASC may be a technical necessity in environment where the streams application is performing mission critical or other infrastructure operation. For example, an electric power station may operate based on a streams application by monitoring a plurality of sensors that observe various energy particulates, chemical mixtures, and the like. The AASC may also facilitate developers and administrators of the stream application to tune or fix the stream application (e.g., to deal with changing source data, and to increase accuracy of calculations performed by the stream application). The tuning or fixing may be performed during execution of the stream application without the risk of potential data loss or going through a reconfiguration of the stream application, and testing and restarting the stream application. AASC may leverage a dynamic proxies convention, such as Java Dynamic Proxies™.

The program code instruction injection of the AASC may benefit debugging applications by logging or other telemetry. The program code instruction injection may allow and/or deny certain elements or connections for security. The program code instruction injection may facilitate higher uptime and streams availability, by facilitating the rerouting of data to an available service if downstream networks and/or compute nodes are down or otherwise offline. The program code instruction injection may increase data accuracy, by executing one or more data integrity routines to verify certain tuples. The program code instruction injection may permit a production environment to demo functionality by inserting, with a first set of program code instructions, demo data (e.g., tuples containing demo data) across a part of the stream application. For example, a first portion of the stream application may be positioned just before a subset of the processing elements and/or stream operators.

The AASC may leverage a first generic program execution structure just before the subset to execute the set of program code instructions that are configured to insert into the stream application demo tuples. The subset of processing elements and/or stream operators may operate on the demo tuples and generate, modify, or otherwise produce tuples based on the demo tuples. A second set of program code instructions may be executed by a second generic program execution structure located just after the subset of the stream application. The second set of program code instructions may be configured to extract the tuples that were produced based on the demo tuples. Further, the second set of program code instructions may be configured to identify any existing tuples that were modified by the subset of the stream application as a result of the demo tuples, and to undo the modification.

Figure 3:
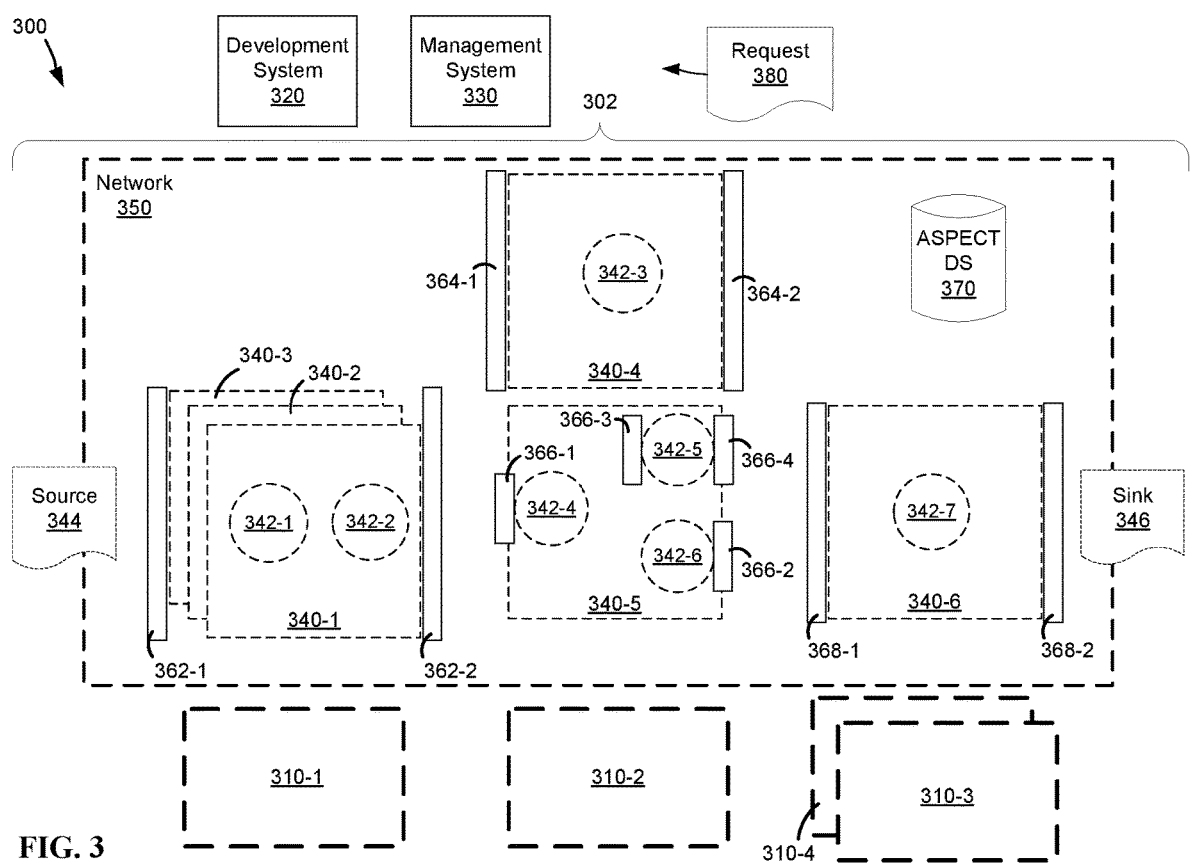
FIG. 3 an example stream application configured as an aspect aware stream computing, consistent with some embodiments of the disclosure.

FIG. 3 an example stream application 300 configured as an AASC, consistent with some embodiments of the disclosure. The stream application 300 may be represented in the form of an operator graph 302. The operator graph 302 may visually represent to a user the flow of data through the stream application 300. The operator graph 302 may be of a similar configuration as the operator graph 202 of FIG. 2, except that the lines representing the flow of tuples throughout the stream application 300 are not depicted to preserve clarity. The operator graph 302 may define how tuples are routed through the various components of the stream application 300 (e.g., an execution path, a precompiled logical layout of processing and resource allocation). The stream application 300 may include one or more compute nodes 310-1, 310-2, 310-3, and 310-4 (collectively, 310); a development system 320; a management system 330; one or more processing elements 340-1, 340-2, 340-3, 340-4, 340-5, and 340-6 (collectively, 340); one or more stream operators 342-1, 342-2, 342-3, 342-4, 342-5, 342-6, 342-7 (collectively, 342); and a network 350. The stream application 300 may further include a plurality of generic program execution structures. Specifically, a first plurality of generic program execution structures 362-1, 362-2 (collectively, 362); a second plurality of generic program execution structures 364-1, 364-2 (collectively, 364); a third plurality of generic program execution structures 366-1, 366-2, 366-3, and 366-4 (collectively, 366); and a fourth plurality of generic program execution structures 368-1 and 368-2. The stream application 300 may also include an aspect datastore 370.

The stream application 300 may receive information from one or more sources 344. The stream application 300 may output information to one or more sinks 346. The input may be from outside the stream application 300, such as from a plurality of IoT devices. The stream network 350 may be a communicate layer that handles connections, sends, and receives data between portions of the stream application 300. For example, stream network 350 may be a transport layer of data packets internal to the stream application 300 and configured to communicatively couple the processing elements 340.

Each generic program execution structure 362, 364, 366, or 368 may be configured to receive, process, and execute requests. For example, generic program execution structure 364-2 may be configured as a request handler or hook that listens for requests to execute sets of program code instructions. In another example, generic program execution structure 362-1 may, responsive to receiving a set of program code instructions, begin executing the set of received program code instructions. Each generic program execution structure 362, 364, 366, or 368 may operate through use of the stream network 350. For example, program execution structure 366-3 may operate through a web socket to accept connections from the management system 330.

The generic program execution structures 362, 364, 366, or 368 may be configured by the management system 330. Specifically, the management system 330 may by default operate by not invoking, not operating, or otherwise not providing processing cycles to any particular code outside of the stream application 300 (e.g., the processing elements 340, the stream operators 342). The management system 330 may operate in a preemptive aspect aware mode. For example, during operation of the stream application 300, the management system may begin to program code to one or more of the generic program execution structures 362, 364, 366, 368 even before receiving a request to perform a set of program code instructions. The management system 330 may operate in a reactive aspect aware mode. For example, during operation of the stream application 300, the management system 330 may not encapsulate any portion of the stream application 300 until receiving a request to execute a set of program code instructions. The stream application 300 may operate in a default aspect aware mode. For example, at the beginning of data processing, the management system 330 may, in addition to assigning compute nodes 310 to the processing elements 340 and stream operators 342, assign generic program code structures 362, 364, 366, 368 to portions of the stream application 300.

The generic program execution structures 362, 364, 366, and 368 may each encapsulate a portion of the stream application 300. Specifically, generic program execution structure 362-1 may be configured as logically occurring just before processing elements 340-1, 340-2, and 340-3. Further, generic program execution structure 362-2 may be configured as logically occurring just after processing elements 340-1, 340-2, and 340-3. Consequently, any set of program code instructions that is dispatched to generic program execution structure 362-1 may be executed just before the processing elements 340-1, 340-2, and 340-3. Respectively, any set of program code instructions that is dispatched to generic program execution structure 362-2 may be executed just after the processing elements 340-1, 340-2, and 340-3. As a result, of encapsulation, and set of program code instructions dispatched to generic program execution structures 362 may operate on a stream of tuples just before or after being processed by processing elements 340-1, 340-2, and 340-3. Consequently, stream operators 342-1 and 342-2 may also be affected by the generic program execution structures 362.

A given portion of stream application that is encapsulated may be a plurality of processing elements. For example, the plurality of processing elements 340-1, 340-2, and 340-3 may all be encapsulated by only the two generic program execution structures 362-1 and 362-2, respectively. A given portion of stream application that is encapsulated may be a single processing element. For example, generic program execution structures 364-1 and 364-2 may encapsulate the single processing element 340-4. A given portion of stream application that is encapsulated may be a plurality of stream operators. For example, generic program execution structures 366-1 and 366-2 may encapsulate stream operators 342-4 and 342-6. A given portion of stream application that is encapsulated may be a single stream operator. For example, generic program execution structures 366-3 and 366-4 may encapsulate stream operator 342-5.

Computing resources may be assigned to the generic program execution structures 362, 364, 366, and 368, by the stream application 300. Assigned computing resources may be a portion of the computing resources that execute the stream application 300. For example, one or more of the compute nodes 310 may be assigned to process the generic program execution structures 362, 364, 366, and 368. The assignment, and or allocation of processing cycles and memory may be based on the operator graph 302 and based on the layout of the portions of the stream application 300. For example, generic program execution structures 362-1 and 362-2 may be assigned to compute node 310-1 based on structures 362-1 and 362-2 encapsulating the portions of the stream application also assigned to compute node 310-1 (e.g., stream operator 342-1, processing element 340-2). In another example, generic program execution structures 366-3 and 366-4 may be assigned to a first thread of execution on compute node 310-2, based on the configuration of stream operator 342-5 also being assigned to the first thread of execution. The assignment of similar threads or other multiprocessing structures as part of the encapsulation, may lead to performance efficiencies (e.g., reduce thread lock contention, eliminate process deadlocking, reduced inter-process communication). The generic program execution structures 362, 364, 366, and 368 may be assigned to computing resources of another computer (not depicted) that is outside of the stream application 300. Assignment to another computer may increase performance of the stream application 300 by having additional computing resources process the stream of tuples. Each generic program execution structure 362, 364, 366, and 368 may be configured to receive and execute program code instructions outside of a preconfigured operation of the stream application 300. For example, a given stream operator 342-1 or processing element 340-2 may be configured and compiled to operate on a first subset of tuples. A corresponding generic program execution structure 366-3 and/or 366-4 may be configured to operate on tuples outside of the first subset of tuples.

The management system 330 may be configured to respond to requests to execute program code instructions (e.g., request 380). Request 380 may be an example of a request that is provided to the AASC stream application 300. Request 380 may be received from a user.

The request 380 may include a set of program code instructions. The set of program code instructions may be in the form of a package or other relevant software construct, such as in the form of an aspect bundle. The set of program code instructions may contain compiled software libraries. The compiled software libraries may be configured in a compatible executable format to the particular portion of the stream application. For example, stream operator 342-7 may be configured in a first software language, and a set of program code instructions may be required to be in the first software language if they are directed to generic program execution structures 368-1 or 368-2, in order to be executable. The set of program code instructions may only be written in a particular set of approved interfaces. For example, a single function implementation that will accept a data tuple and return a data tuple using a tuple schema defined by an approved interface.

The request 380 may also include a set of program execution instructions. The set of program execution instructions may include a stream application target. The stream application target may be specific processing element or stream operator of a given stream application. For example, request 380 may include a stream application target that includes a stream operator identifier that specifically identifies stream operator 342-5. The request 380 may thus indicate that the included set of program code instructions are to be executed by the generic program execution structures 366-3 and 366-4 (e.g., the generic program execution structures that encapsulate stream operator 342-5).

The management system 330 may instruct at least one given generic program execution structure of the generic program execution structures 362, 364, 366, or 368 to perform the received set of program code instructions (e.g., the program code instructions that are a part of the request 380). The particular portion of the set of portions of the stream application 300 may be based on the request 380. Specifically, the particular portion may specify a part of the instructions that the network 350 may receive (e.g., an existing job ID, a given stream operator 342 based on location or port), and the set of program code instructions to be executed. The management system 330 may identify a particular stream application target based on the request. For example, request 380 may include a type of particular stream operation, such as all "SET" operations that are applicable to the include set of program code instructions. Responsively, the management system 330 may scan the operator graph 302 to identify a subset of one or more stream operators 342 or processing elements 340 that perform "SET" operations. The management system 330 may instruct a given generic program execution structure 362, 364, 366, or 368 to perform the received set of program code instructions with one or more conditions (e.g., a number of times to execute the program code instructions, execute program code instructions for a certain amount of time, execute the program code instructions before or after one or more conditions or inputs or outputs occur at the portion of the stream application 300). The conditions may be received as part of the program execution instructions, such as part of the request 380.

The management system 330 may also store the program code instructions for later use. Specifically, once the management system 330 receives the request 380, the management system 330 may store the set of program code instructions into the aspect datastore 370. The aspect datastore 370 may be a database, memory, tertiary storage, or other data structure configured to store aspect bundles and other program code instructions. The storage in aspect datastore 370 may enable high availability of AASC for stream application 300. Future requests may only need to identify the particular set of program code instructions (e.g., by a filename or other unique identifier). Responsive to receiving a request with an identifier and without a specific set of program code instructions, the management system 330 may be configured to scan aspect datastore 370 to retrieve a stored set of program code instructions. Other requests from different users may identify the particular set of program code instructions by an identifier to run at a different time.

The management system 330 may operate in a security mode. Specifically, the management system 330 may be configured to handle authentication and authorization of requests that are submitted. Any request that is submitted may be authorized by the management system 330 before it is permitted to be passed onto a particular generic program execution structure 362, 364, 366, or 368. The management system 330 and any requestor may communicate through a secure communication channel, (e.g., through an encrypted network, using public/private certificates). Requestors may not directly be able to execute sets of program code instructions, but only may be able to submit and authenticate through the management system 330.

The AASC of stream application 300 may facilitate an extensible set of enhancements that may be invoked during stream computing operation. In detail, various sets of program code instructions may be executed by one or more of the generic program execution structures 362, 364, 366, and/or 368 to perform various operations against the stream application that result in particular use cases. For example, a first use case may be tuple generation and injection that acts as a dynamic source to inject tuples into stream operators for replaying streams, debugging operator logic, and on-demand tuple processing. In another example, a second use case may be tuple validation that checks if tuples are valid according to schema, or within a valid range; further, the set of program code instructions may also be configured to drop tuples that may be determined to be invalid. In yet another example, a third use case may be tuple transformation that includes dynamic custom logic that can be added to manipulate certain tuples.

Other enhancements facilitated by AASC of stream application 300 may include sets of program code to perform the following: logging, debugging, profiling, notifications, caching, rerouting, dropping, and transactional processing. In a first example, logging may occur by debugging or audit logging that can be configured to include a given user, data, time, and whether an operation was successful. In a second example, profiling may occur by determining how long it takes a stream operator 342 to process tuples by comparing timestamps before and after processing has occurred. In a third example, notifications may be sent when certain criteria defined in the set of program code instructions is met. In a fourth example, caching may occur based on program code instructions that are configured to save certain tuples for offline processing. In a fifth example, rerouting may occur based on program code instructions that define rules to route certain tuples to another stream operator, such as when a first stream operator is overloaded or experiencing certain performance issues. In a sixth example, dropping may occur based on program code instructions that define rules to drop tuples, such as to alleviate an overloaded stream operator, or based on updated filtering conditions. In a seventh example, transactional processing may occur based on program code instructions to have data of a single tuple split into multiple tuples. Logic in the seventh example may include program code instructions that gate tuple processing proceeds to only occur if all tuples in a transaction are received by a given stream operator 342. In an eighth example, security may occur based on program code instructions configured to block data from certain connections or users that are deemed malicious.

Figure 4:
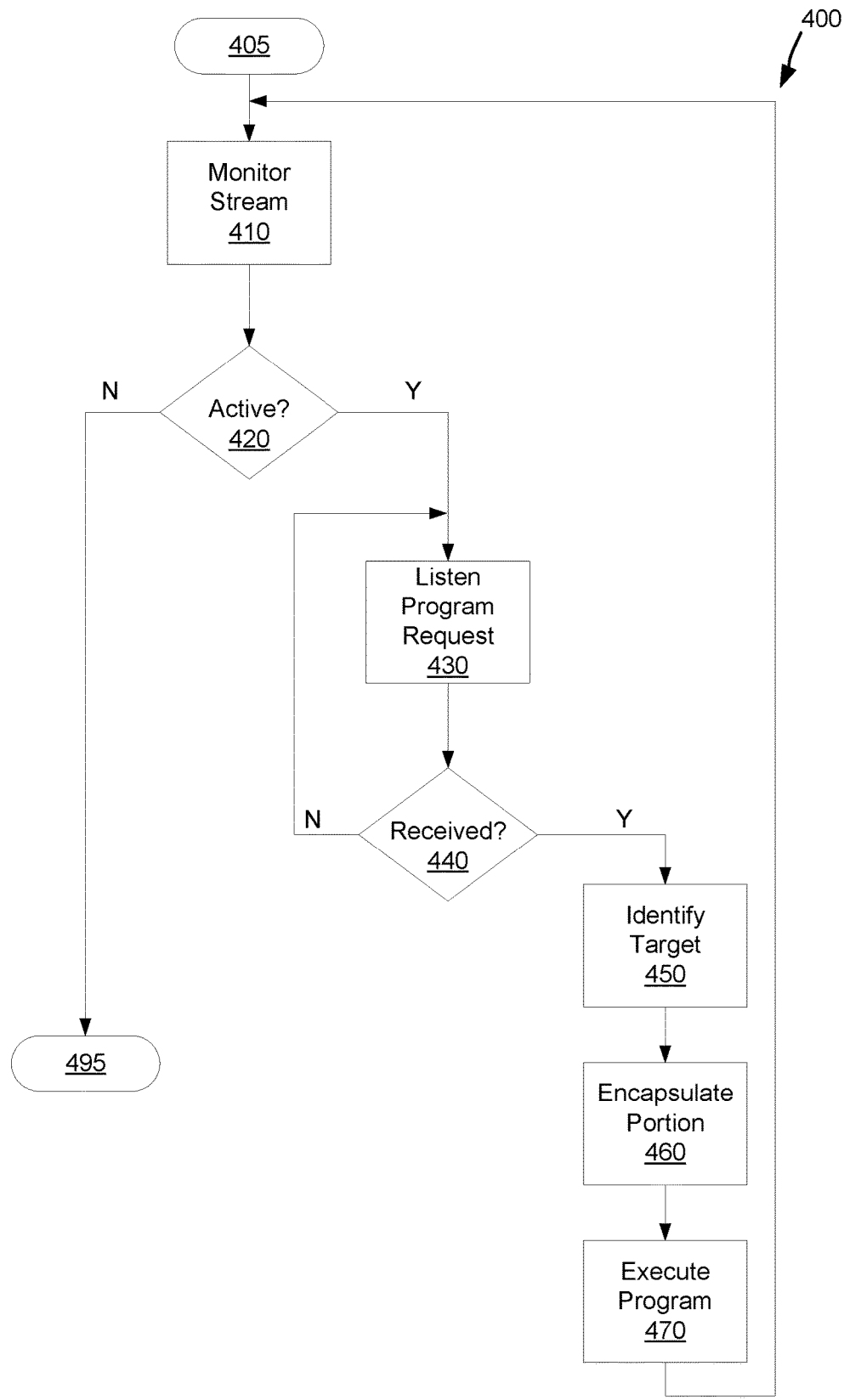
FIG. 4 depicts a method of performing aspect aware stream computing, consistent with some embodiments of the disclosure.

FIG. 4 depicts a method 400 of performing aspect aware stream computing, consistent with some embodiments of the disclosure. Method 400 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). Method 400 may be performed by a single computer, such as computer system 100. Method 400 may be performed by a stream application, such as stream application 400.

From start 405, method 400 may begin by monitoring a stream application for activity. Monitoring of a stream application may be performed by determining if one or more processing elements and/or stream operators of a stream application are operational and configured to actively process a stream of tuples.

If a stream application is active at 420:Y, method 400 may continue by listening for program requests at 430. Listening for program requests may occur by a portion of a stream application. For example, a management system of a stream application may operate by listening for requests.

If a program request is received, at 440:Y, method 400 may continue by identifying a stream application target of the stream application at 450. Specifically, a request may include a particular stream operator or processing element that is a target of a request (e.g., based on an identifier). A request may include a particular type, category, or group of portions of a stream application. For example, a stream application target that specifies "any SET stream operator" may be included in a request. A request may not include a stream application target, but the stream application target may be identified indirectly. For example, a request may include a particular identifier of a set of program code instructions that are to be executed. The request may only include an identifier of the program code instructions, but not a target. Upon receipt of the request, a program repository (e.g., aspect datastore 370) may be scanned, searched, or otherwise accessed. Identification of the stream application target may be performed by retrieving from the program repository the program code instructions and scanning the program code instructions to determine a portion of the stream application that is to be processed by the program code instructions.

A portion of the stream application may be encapsulated at 460. The stream application may be encapsulated with a generic program execution structure that is configured to receive and execute program code instructions. The stream application may be encapsulated during runtime of the stream application. For example, a given stream operator or processing element may be configured with a first input and a first output. The first input may be configured to receive a plurality of tuples of a stream of tuples, and the first output may be configured to output a second plurality of tuples of the stream of tuples. A given stream operator or processing element may also be configured with a second input; the second input may be configured to receive an aspect flag, such as a Boolean or numerical value. By default, upon beginning of execution of the stream application, the default configuration of the stream operator or processing element may be to operate without any generic program execution structure being reachable or operational. Without receiving any aspect flag, the stream application may not operate with any generic program execution structure. Upon receipt of the flag, the stream application may begin to operate with encapsulated generic program execution structure.

At 470, a portion of the stream application may execute the identified program code instructions. The portion of the stream application may be a set of one or more processing cycles that are outside of the portion of the stream application, such as a management system or other portion that is not a part of the precompiled logic of the stream application, may transmit the program code instructions to the generic program execution structure. The generic program code execution structure may execute the program code instructions. After the program code instructions are executed, method 400 may continue by monitoring the stream application at 410. If the stream application is not active at 410:N, method 400 may end at 495.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for processing streams of tuples, the method comprising:
   monitoring a stream of tuples to be processed by a plurality of processing elements that operate on one or more compute nodes of a stream application, each processing element having one or more stream operators;
   receiving a program request to execute a first set of one or more program code instructions;
   identifying, based on the program request, a stream application target of the first set of program code instructions;
   encapsulating, during operation of the stream application, a first portion of a set of one or more portions of the stream application with a generic program execution structure, the generic program execution structure configured to receive and execute program code instructions outside of a preconfigured operation of the stream application; and
   executing, during operation of the stream application and in response to the program request and based on the stream application target and by the generic program execution structure, the first set of program code instructions at a first time period of execution of the first portion of the stream application.

2. The method of claim 1, wherein the program request includes the first set of program code instructions.

3. The method of claim 1, wherein the program request includes a program identifier related to the first set of program code instructions.

4. The method of claim 3, wherein the first set of program code instructions is located in a program repository.

5. The method of claim 4, wherein the program repository is a part of the stream application.

6. The method of claim 1, wherein the program request includes a first set of one or more program execution instructions that are related to the first set of program code instructions.

7. The method of claim 6, wherein the first set of program execution instructions includes the stream application target.

8. The method of claim 6, wherein the first set of program execution instructions includes a number of times to execute the first set of program code instructions.

9. The method of claim 6, wherein the first set of program execution instructions includes a termination condition to stop execution of the first set of program code instructions.

10. The method of claim 1, wherein the first portion of the set of portions of the stream application is a processing element of the stream application.

11. The method of claim 1, wherein the first portion of the set of portions of the stream application is a stream operator of the stream application.

12. The method of claim 11, wherein the first time period is before the stream application executes the stream operator and after the stream application executes any other portion of the set of portions of the stream application.

13. The method of claim 12, wherein the first time period is after the stream application executes the stream operator.

14. The method of claim 11, wherein the first time period is after the stream application executes the stream operator and before the stream application executes any other portion of the set of portions of the stream application.

15. The method of claim 1, further comprising:
   encapsulating, during operation of the stream application, a second portion of the set of portions of the stream application with a second generic program execution structure; and
   executing, during operation of the stream application and in response to the program request and based on the stream application target and by the second generic program execution structure, the first set of program code instructions at a second time period of execution of the second portion of the stream application.

16. The method of claim 1, wherein the first set of program code instructions include program code instructions to log operation of the stream application.

17. The method of claim 1, wherein the first set of program code instructions include program code instructions to generate one or more additional tuples.

18. The method of claim 1, further comprising:
   encapsulating, during operation of the stream application, a second portion of the set of portions of the stream application with a second generic program execution structure;
   receiving a second program request to execute a second set of one or more program code instructions;
   identifying, based on the second program request, a second stream application target of the second set of program code instructions; and
   executing, during operation of the stream application and in response to the second program request and based on the second stream application target and by the second generic program execution structure, the second set of program code instructions at a second time period of execution of the second portion of the stream application.

19. A system, the system comprising:
   a memory, the memory containing one or more instructions; and
   a processor, the processor communicatively coupled to the memory, the processor, in response to reading the one or more instructions, configured to:
      monitor a stream of tuples to be processed by a plurality of processing elements that operate on one or more compute nodes of a stream application, each processing element having one or more stream operators;
      receive a program request to execute a first set of one or more program code instructions;
      identify, based on the program request, a stream application target of the first set of program code instructions;
      encapsulate, during operation of the stream application, a first portion of a set of one or more portions of the stream application with a generic program execution structure, the generic program execution structure configured to receive and execute program code instructions outside of a preconfigured operation of the stream application; and
      execute, during operation of the stream application and in response to the program request and based on the stream application target and by the generic program execution structure, the first set of program code instructions at a first time period of execution of the first portion of the stream application.

20. A computer program product, the computer program product comprising:

one or more computer readable storage media; and
program instructions collectively stored on the one or more computer readable storage media, the program instructions configured to:
  monitor a stream of tuples to be processed by a plurality of processing elements that operate on one or more compute nodes of a stream application, each processing element having one or more stream operators;
  receive a program request to execute a first set of one or more program code instructions;
  identify, based on the program request, a stream application target of the first set of program code instructions;
  encapsulate, during operation of the stream application, a first portion of a set of one or more portions of the stream application with a generic program execution structure, the generic program execution structure configured to receive and execute program code instructions outside of a preconfigured operation of the stream application; and
  execute, during operation of the stream application and in response to the program request and based on the stream application target and by the generic program execution structure, the first set of program code instructions at a first time period of execution of the first portion of the stream application.

* * * * *